United States Patent
Lorenz (10) Patent No.: US 10,737,762 B2
(45) Date of Patent: Aug. 11, 2020

(54) LATCHING AND LOCKING MECHANISM FOR A FOLDABLE WING ARRANGEMENT

(71) Applicant: Airbus Operations GmbH, Hamburg (DE)

(72) Inventor: Christian Lorenz, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 363 days.

(21) Appl. No.: 15/685,435

(22) Filed: Aug. 24, 2017

(65) Prior Publication Data
US 2018/0057144 A1 Mar. 1, 2018

(30) Foreign Application Priority Data
Aug. 26, 2016 (EP) ..................................... 16185948

(51) Int. Cl.
*B64C 3/56* (2006.01)

(52) U.S. Cl.
CPC ................. *B64C 3/56* (2013.01); *Y02T 50/14* (2013.01)

(58) Field of Classification Search
CPC .. B64C 3/40; B64C 3/56; B64C 11/28; B64C 23/072; B64C 27/50
See application file for complete search history.

(56) References Cited

U.S. PATENT DOCUMENTS 6,260,799 B1 * 7/2001 Russ ......................... B64C 3/56
244/49
2013/0313356 A1 11/2013 Santini et al.

FOREIGN PATENT DOCUMENTS

EP 2 857 309 4/2015
EP 3 000 723 3/2016

OTHER PUBLICATIONS

Extended Search Report for EP 16185948.3, dated Feb. 17, 2017, 7 pages.

* cited by examiner

*Primary Examiner* — Nicholas McFall
(74) *Attorney, Agent, or Firm* — Nixon & Vanderhye P.C.

(57) ABSTRACT

A wing arrangement for an aircraft including a latching arrangement (29, 29', 29") having a latching member (31, 31', 31") and an engagement device (33), wherein the latching member (31, 31', 31") is fixed to a wing tip section (13), and the engagement device (33) has a base member (35) on a wing base section (7) and has an abutment surface (43), and an engagement member (45, 45', 63) supported on the base section (7) and moves between a release position and a latching position by an actuator (49, 49') coupled to the engagement member (45, 45', 63) and the base section (7), wherein when the tip section (13) is in the deployed position, the latching member (31, 31', 31") abuts the abutment surface (43) and the engagement member (45, 45', 63) can move between the release position and the latching position, wherein when the latching member (31, 31', 31") abuts the abutment surface (43) and the engagement member (45, 45', 63) is in the latching position, the engagement member (45, 45', 63) abuts on a surface section of the latching member (31, 31', 31") facing away from the abutment surface (43) to prevent a pivot movement of the tip section.

14 Claims, 5 Drawing Sheets

LATCHING AND LOCKING MECHANISM FOR A FOLDABLE WING ARRANGEMENT

RELATED APPLICATION

This application claims priority to and the benefit of European Patent Application 16185948 filed Aug. 26, 2016, the entirety of which is incorporated by reference.

BACKGROUND

The present invention relates to a wing arrangement for an aircraft comprising a wing having a base section and a tip section, the base section having a first end portion and a second end portion, the tip section having a third end portion and a fourth end portion, wherein the first end portion is adapted to be coupled to the fuselage of the aircraft and wherein the second end portion and the third end portion are coupled with each other so that the tip section is pivotable with respect to the base section about a pivot axis.

The aspect ratio, i.e. the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end portion of the wing between a deployed position, in which the wing has its normal flight configuration, and a stowed position, in which the wing has a folded configuration and the wingspan is decreased as compared to the deployed position.

SUMMARY OF INVENTION

An invention has been conceived and is disclosed herein to provide a wing arrangement having a foldable wing which is safe and reliable in operation and has at the same time of a simple construction.

The wing arrangement according to an embodiment of the invention comprises a wing having a base section and a tip section. The base section has a first end portion and a second end portion, the first end portion being adapted to be coupled to the fuselage of an aircraft. The tip section has a third end portion and a fourth end portion and the second end portion and the third end portion are coupled with each other by a coupling arrangement such that the tip section is pivotable with respect to the base section about a pivot axis between a stowed position and a deployed position. The spanwise length of the wing between the first end portion and the fourth end portion is larger in the deployed position than in the stowed position. Thus, the spanwise length of the wing arrangement according to the present invention can be altered by pivoting the tip section between the deployed and the stowed position. In particular, this allows to reduce the space required for the aircraft when being on the ground whereas the aircraft can have a large spanwise length when being in flight.

Further, the wing arrangement comprises a latching arrangement for latching the tip section relative to the base section at least when being in the deployed position. The latching arrangement comprises a latching member and an engagement device. The latching member is fixed to one of the second end portion and the third end portion, and the engagement device comprises a base member which is supported in a predetermined position on the other of the second end portion and the third end portion and which comprises an abutment surface. Moreover, an engagement member which is also supported on said other of the second end portion and the third end portion and is movable between a release position and a latching position by means of an actuator coupled to the engagement member and said other of the second end portion and the third end portion.

The latching member may be fixed to the third end portion whereas the base member of the engagement device, the engagement member and the actuator are supported on the second end portion, i.e. in this embodiment one of the second end portion and the third end portion is formed by the third end portion so that the latching member is fixed on the tip section, whereas said other of the second end portion and the third end portion is formed by the second end portion so that the base member of the engagement device as well as the engagement member and the actuator are supported on the base section. This minimizes the weight of the tip section and, hence, the load to be supported by the coupling arrangement.

When the tip section is in the deployed position, the latching member abuts on the abutment surface and the engagement member can be moved between the release position and the latching position. When the latching member abuts on the abutment surface and the engagement member is in the latching position, the engagement member abuts on a surface section of the latching member facing away from the abutment surface so as to prevent a pivot movement of the tip section about the pivot axis out of the deployed position towards the stowed position.

Thus, in the latching position of the engagement member, the latching member is latched by the engagement device in a fixed position. On the one hand the abutment surface prevents the latching member and hence the tip section from a pivotal movement in a first direction about the pivot axis whereas the engagement member also abuts on the latching member but prevents a movement thereof in a second direction about the pivot axis opposite the first direction.

When the engagement member is in the release position, the latching member may move away from the abutment surface so as to allow for a pivot movement of the tip section from the deployed position towards the stowed position. Hence, when the engagement member is in the release position, the tip section is released, and a pivotal movement thereof is enabled.

In the arrangement of the embodiment of the present invention neither the latching member nor the base member with the abutment surface on which the latching member abuts when the tip section is in deployed position, need to be moved to latch or release the tip section. Instead, a third movable element is provided, namely the engagement member, which effects the latching. Thus, to release the tip section it is not required that the latching member itself is directly moved out of engagement with a base member which would require to apply large forces when the latching member is pressed against the abutment surface e.g. by wind forces. Instead, the engagement member is moved away from the latching member to release the latter.

Further, to obtain latching of the tip section, it is not required that the latching member is exactly aligned to its final latching position. A certain initial misalignment could be compensated for by the engagement member and the actuator by pressing the latching member against the abutment surface.

In an embodiment of the invention, the predetermined position of the base member relative to the other of the second end portion and the third end portion may be adjustable such that the base member may move along a direction extending in a plane which is inclined to the pivot axis and which is inclined to a line connecting the base member and the pivot axis.

In particular, the moving direction of the base member is a tangent to a circle extending in a plane inclined with respect to the pivot axis and having a radius that corresponds to the distance of the base member, particularly its center, from the pivot axis.

The adjustability of the base member allows to adjust the pivotal position of the latching member about the pivot axis in which it can be latched and, hence, to adjust the exact angle of the tip section relative to the base section when being in the deployed position. Thus, manufacturing tolerances of the parts forming the base section and the tip section and especially the coupling arrangement can easily be compensated for.

In such an arrangement, the engagement member and the actuator may be coupled to the base member so that their position is adjusted together with the base member.

In a further embodiment, the coupling arrangement comprises a first coupling part and a second coupling part. The first coupling part and the second coupling part are pivotably coupled with each other in such a manner that the second coupling part is guided for a pivot movement by the first coupling part about the pivot axis, wherein the first coupling part is fixedly connected to said one of the second end portion and the third end portion and the second coupling part is fixedly connected to said other of the second end portion and the third end portion. Finally, the latching member is mounted on the first coupling part. Such an arrangement provides for a short load path between the latching member and the coupling arrangement and the number of parts which have to be designed such that they are able to carry the respective loads applied to the tip section during flight can be minimized which in turn leads to weight savings.

When the first coupling part has an annular shape and surrounds the pivot axis, the latching member may extend radially with respect to the pivot axis beyond the first coupling part. This leads to a compact design of the combination of the coupling arrangement and the latching arrangement with the latching arrangement being positioned tangentially with respect to the coupling arrangement.

In a further embodiment, the engagement member is formed as an engagement lever which is pivotably coupled about a lever axis on said other of the second end portion and the third end portion so that the engagement lever may pivot between the latching position and the release position about the lever axis. Here, the lever axis is arranged such that in the release position a contact portion of the engagement lever for contacting the latching element in the latching position is offset from the plane in which the latching member moves during the pivotal movement of the tip section. Especially such an arrangement allows to press the latching member against the abutment surface on the base element by the pivotal movement of the lever.

When the engagement device comprises a first actuating lever and a second actuating lever, wherein the first actuating lever is pivotably coupled with the engagement lever, the second actuating lever may be pivotably coupled to the first actuating lever spaced from the pivotal coupling between the first actuating lever and the engagement lever, the second actuating lever is pivotably coupled to said other of the second end portion and the third end portion and the actuator is a linear actuator the first end of which being coupled to said other of the second end portion and the third end portion and the other end being connected to the first or second actuating lever. In such a way a simple mechanism can be realized to move the engagement lever between the latching position and the release position.

The engagement lever may be pivotably mounted on the base member, when the second actuating lever may be mounted on the base element and the first end of the linear actuator may be mounted on the base member. With such an arrangement adjustability of the entire engagement device can be realized in a simple manner.

Furthermore, in the release position the coupling between the first actuating lever and the second actuating lever may be arranged on a first side of a connecting line connecting the coupling between the first actuating lever and the engagement lever and the coupling between the second actuating lever and said other of the second end portion and the third end portion and wherein in the latching position the coupling between the first actuating lever and the second actuating lever is arranged on a second side of the connecting line opposite the first side. With such an arrangement a toggle mechanism is formed and in the latching position the coupling between the actuating levers is positioned on that side of the dead center opposite the release position. Hence, a locking of the latching mechanism in the latching position is ensured preventing the engagement member from inadvertently leaving the latching position. In particular, a force which would move the latching member in the direction towards the stowed position would result in force which maintains the actuating levers in the latching positions.

In a further embodiment the engagement lever is biased towards the latching position and the actuator is a linear actuator the first end of which being coupled to said other of the second end portion and the third end portion and the other end being connected to the engagement lever. In particular the first end of the engagement lever can be pivotably mounted on the second end portion and the first end of the linear actuator can also be mounted on the second end portion.

When the tip section is in the deployed position and the engagement lever is in the latching position, the contact plane between the contact portion of the engagement lever and the latching member may be inclined with respect to a plane perpendicular to the pivot axis. In such an arrangement when the engagement lever is in the latching position and the latching member is forced towards the stowed position, the frictional engagement between the latching member and the engagement lever result in a torque which keeps the engagement lever in the latching position. Hence, locking of the engagement lever and the latching arrangement in the latching position is obtained.

In another embodiment, the engagement member is supported pivotably on the base member so that the engagement member may pivot about a member axis between the release position and the locking position. The engagement member comprises a main portion which is dimensioned such that both in the release position and in the latching position the main portion does not extend into a planar space in which the latching member moves during pivotal movement between the deployed position and the stowed position. Finally, a projection is provided on the main portion projecting beyond the main portion an a radial direction relative to the member axis and comprising a stop surface which points to the abutment surface, when the engagement member is in the latching position wherein the projection is dimensioned such that it does not extend into said planar space when the engagement member is in the release position, and that when the engagement member is in the latching position the projection extends into the planar space such that when the tip section is in the deployed position, the latching member is received between the abutment surface and the stop surface. This is a further option for a latching arrangement which allows to press the latching member towards the latching position, i.e. towards the abutment surface. The engagement member can be pivoted by means of a rotary actuator.

When the stop surface is planar and inclined with respect to the member axis, the frictional engagement between the projection and the latching member may result in locking of the engagement member in the latching position.

SUMMARY OF THE DRAWINGS

In the following, embodiments of the present invention will be described with reference to the accompanied drawings. In the drawings

DETAILED DESCRIPTION OF INVENTION

Figures 1A, 1B:
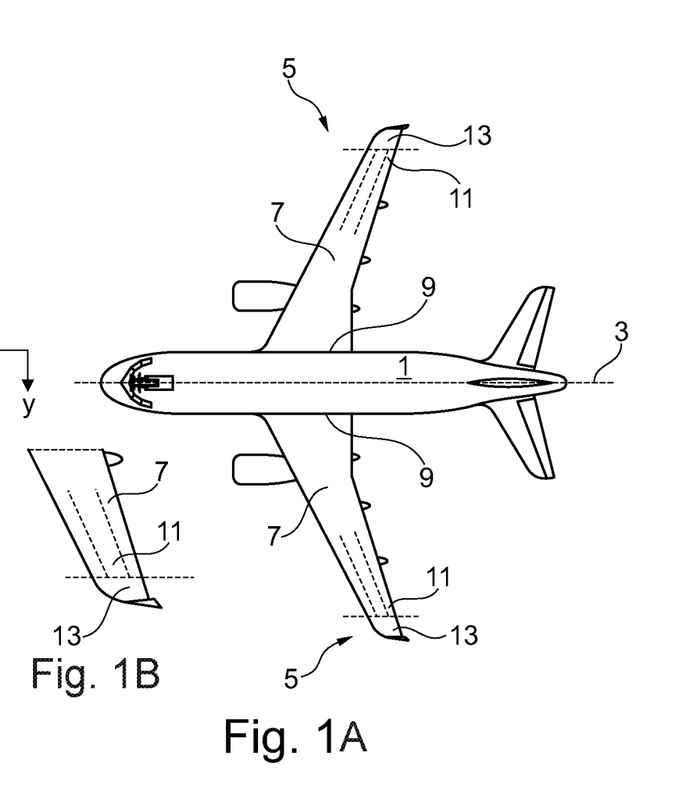
FIG. 1A is a schematic top view of an aircraft to which an embodiment of a wing arrangement according to the present invention is secured.
FIG. 1B is a schematic tip view of a portion of the wing arrangement shown in FIG. 1A.

FIGS. 1A and 1B show a schematic top view of an aircraft being provided with two wing arrangements according to a first embodiment of the present invention. The aircraft comprises a fuselage 1 extending along a longitudinal axis 3 which corresponds to the x-axis of the aircraft (the y-axis extends perpendicular to the x-axis in a horizontal plane when the aircraft is on the ground, whereas the z-axis extends vertically perpendicular to the x and y-axes). The wings 5 extend away from the fuselage 1, and each wing 5 comprises a base section 7 having a first end portion 9 which is coupled to the fuselage 1. As it can also be seen from FIG. 2, which shows the wing 5 in more detail, the base section extends between the first end portion 9 and a second end portion 11 (as is also shown in FIG. 1B).

Figure 2:
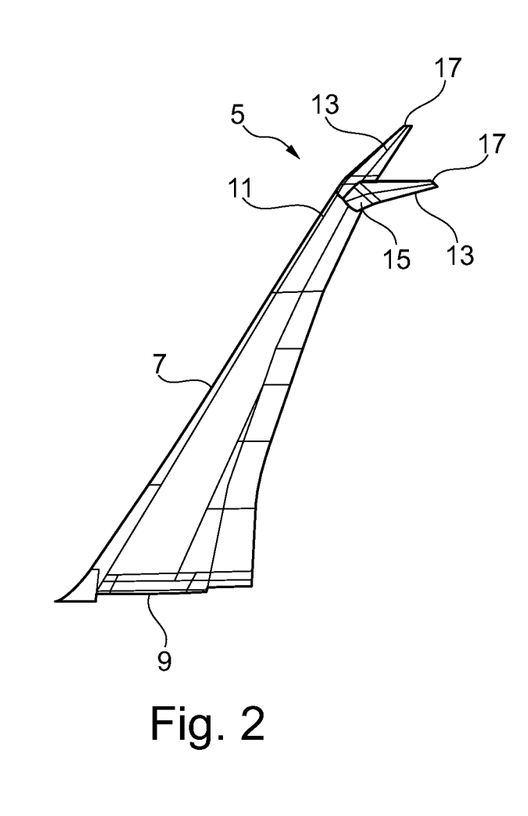
FIG. 2 is a top view of a wing of a first embodiment of a wing arrangement of the present invention.
Figure 3:
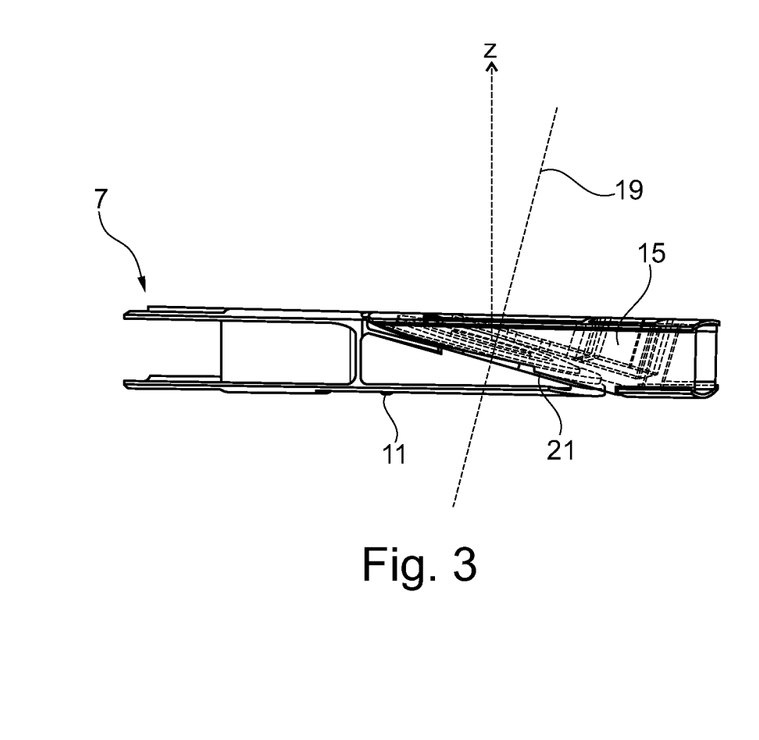
FIG. 3 is a cross sectional view of a portion of the wing of FIG. 2 showing the coupling arrangement.

A tip section 13 of the wing 5 is pivotably connected to the second end portion 11 of the base section 7. In particular, the tip section 13 extends away from the distal end or second end portion 11 of the base section 7 and comprises a third end portion 15 and a fourth end portion 17. The third end portion 15 is pivotably mounted on the second end portion 11 of the base section 7 so that the tip section 13 may pivot between a deployed position and a stowed position about a pivot axis 19 (see FIG. 3). The pivot axis 19 extends essentially vertically but is tilted, such as by 15°, with respect to the z-axis of the aircraft, as it is shown in FIG. 3. The tip section 13 may pivot between a deployed position in which it extends essentially along the longitudinal axis of the base section 7, and a stowed position in which the tip section 13 is angled backwards with respect to the longitudinal axis of the base section 7 (see FIG. 2, which shows both positions). In particular, as shown in FIG. 2, the spanwise length of the entire wing 5 formed of the base section 7 and the tip section 13 is larger in the deployed position than in the stowed position. In other words, in the deployed position the length of the entire wing 5 measured parallel to the y-axis is larger compared to the stowed position. Further, the pivot axis 19 is tilted such that the fourth end portion 17 of the tip section 13, when the tip section 13 pivots from the deployed position to the stowed position, moves upwards.

Figure 4:
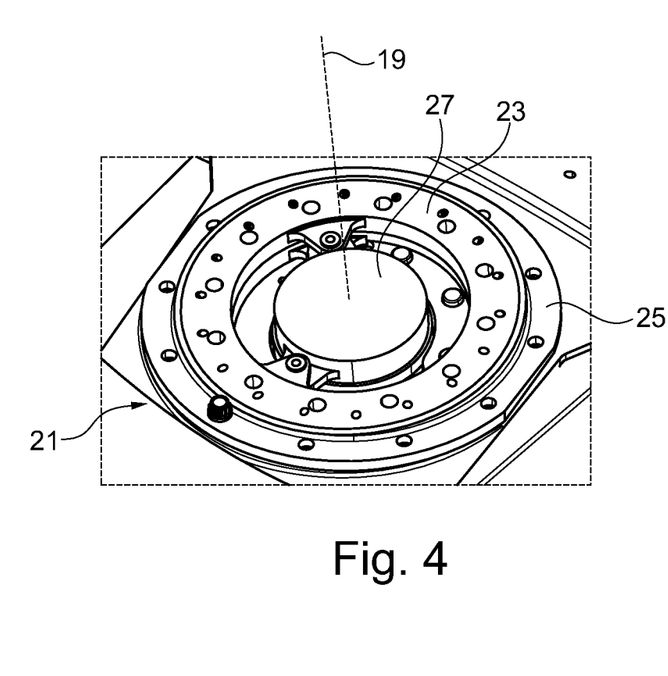
FIG. 4 is a perspective view of the coupling arrangement of the wing arrangement of FIG. 2.

As shown in FIGS. 3 and 4, the second and third end portions 11, 15 of the base section and the tip section are pivotably coupled with each other by a coupling arrangement 21 comprising a first annular or ring shaped coupling part 23 and a second annular shaped coupling part 25 which surround the pivot axis 19. The first coupling part 23 is fixedly connected to the third end portion 15 of the tip section 13 whereas the second coupling part 25 is fixedly connected to the second end portion 11 of the base section 7 of the wing 5. The coupling parts 23, 25 are configured such that the first coupling part 23 is guided on guide surface on the second coupling 25 so that the first coupling part 23 may pivot with respect to the second coupling part 25 about the pivot axis 19.

In order to effect the pivotal movement of the tip section 13 between the deployed and the stowed positions, an actuating device 27 is provided one part of which is coupled to the base section 7, and the second part of the actuating device 27 is fixedly connected to the first coupling part 23. The actuating device 27 comprises drive means so as to pivotally move the second part relative to the first part which in turn results in a pivotal movement of the first coupling part 23 relative to the second coupling part 25 and, hence, a pivotal movement of the tip section 13 relative to the base section 7.

The first embodiment of a wing arrangement according to the present invention further comprises a latching arrangement 29 for latching the tip section 13 relative to the base section 7 when being in the deployed position.

Figure 5:
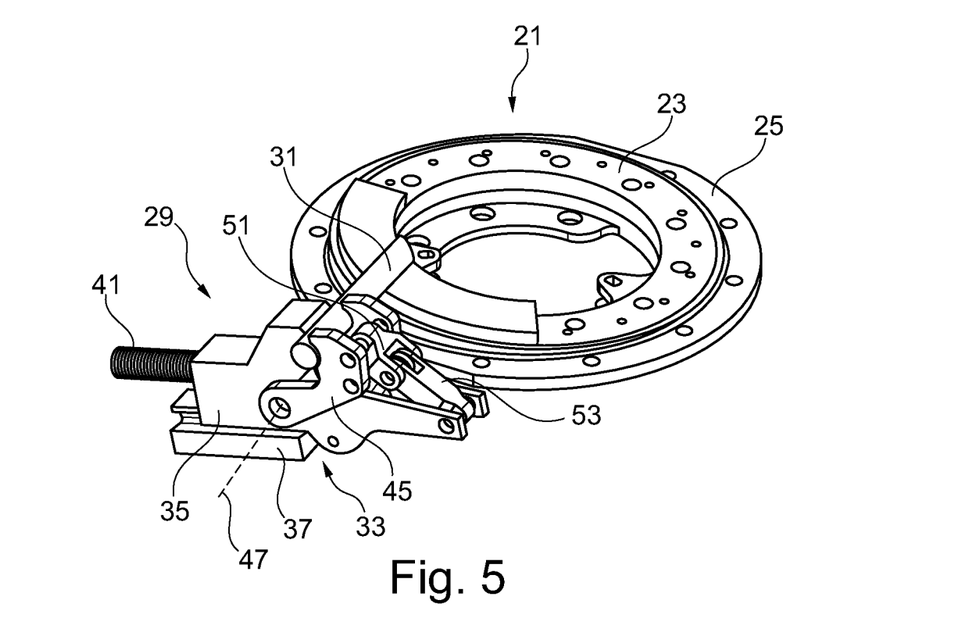
FIG. 5 shows a perspective view of the coupling arrangement and the latching arrangement of the wing arrangement of FIG. 2.
Figure 6:
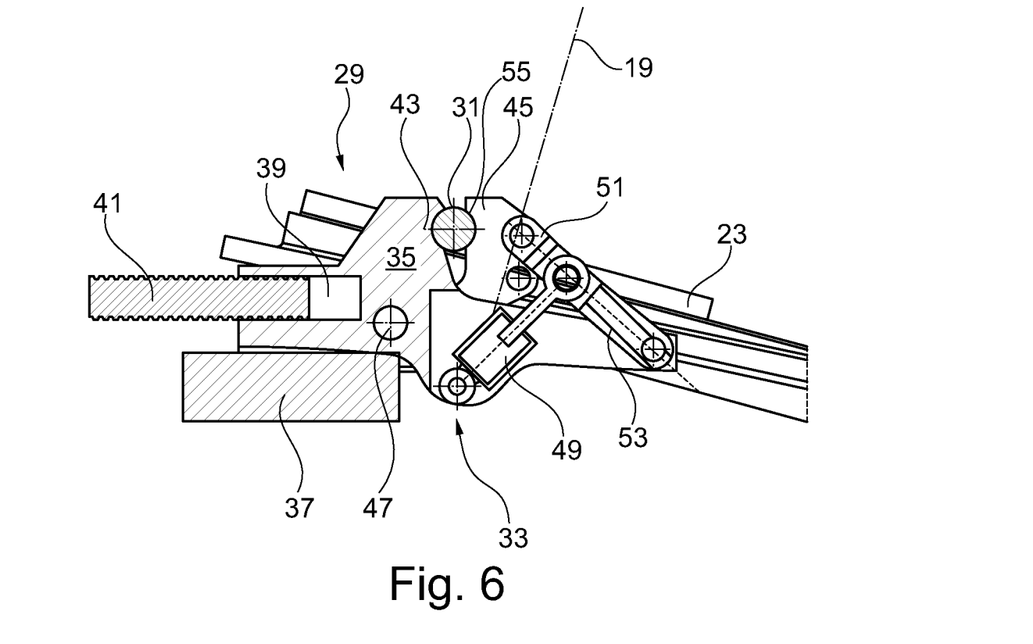
FIG. 6 is a cross sectional view of the latching arrangement shown in FIG. 5.

As shown in FIGS. 5 and 6, the latching arrangement 29 comprises a latching member 31 which in the first embodiment is rod-shaped and extends away from the pivot axis 19. The latching member 31 is fixedly mounted on the first coupling part 23 so that it pivots together with the tip section 13.

Further, the latching arrangement 29 includes an engagement device 33 which comprises a base member 35 which is located in a predetermined position on the second end portion 11 of the base section 7. The predetermined position of the base member 35 relative second end portion 11 may be adjustable so that the base member 35 may move along a direction extending in a plane which is inclined to the pivot axis 19, the direction being also inclined with respect to a virtual line connecting the base element 35 and the pivot axis 19.

In particular, the base member 35 is guided by a rail element 37 fixed on the second end portion 11, and the base member 35 is provided with a threaded hole 39 into which a threaded rod 41 is screwed. The threaded rod 41 is axially fixed but rotatably supported on the second end portion 11 so that rotation of the threaded rod 41 results in a movement of the base member 35 along the rail element 37 in the axial direction of the threaded rod 41. As can be in FIG. 6, the axial direction of the threaded rod 41 is inclined with respect to the pivot axis 19 and also inclined or even perpendicular to a virtual line connecting the base member 35 and the pivot axis 19.

The base member 35 comprises an abutment surface 43, on which the latching member 31 abuts when the tip section 13 is in the deployed position, so that the position of the abutment surface 43 defines the pivot position for the tip section 13 when being in the deployed position. By adjusting the position of the base member 35 along the rail element 37 via the threaded rod 41, the deployed position can be adjusted and it can be compensated for manufacturing tolerances.

In addition, the engagement device 33 is provided with an engagement member in the form of an engagement lever 45 which is pivotably mounted about a lever axis 47 on the base member 35, even though it is also conceivable that the engagement member is directly mounted on the second end portion 11. However, when being mounted on the base member 35, the engagement lever 45 is moved together with the base member 35, when the position of the latter is adjusted. The engagement lever 45 may pivot between a latching position and a release position about the lever axis 47, and is moved between these positions by means of an actuator 49 as will be discussed below.

For pivoting the engagement lever 45, the engagement device 33 comprises a first actuating lever 51 and a second actuating lever 53. A first end of the first actuating lever 51 is pivotably coupled with the engagement lever 45 and the second end of the first actuating lever 51 is pivotably coupled to a first end of the second actuating lever 53. Finally, the second end of the second actuating lever 53 is pivotably coupled to the base member 35. The actuator 49 is a linear actuator the first end of which is coupled to the base member 35 and the other end being connected to the first and second actuating levers 51, 53 at the pivotal connection between the levers 51, 53. The length of linear actuator 49 can be varied via drive means which results in a pivotal movement of the engagement lever 45.

As shown in FIGS. 5 and 6, when the tip section 13 is in the deployed position and, hence, the latching member 31 abuts on the abutment surface 43 of the base member 35, the engagement lever 45 can be moved or pivoted between a latching position and a release position. As can be seen in FIG. 6, in the latching position a contact portion 55 of the engagement lever 45 abuts on the latching member 31 on a surface section facing away from the abutment surface 43 so that the latching member 31 is sandwiched between the abutment surface 43 and the contact portion 55 of the engagement lever 45 and, hence, latched or kept in position. In particular, a pivotal movement of the tip section 13 away from the deployed position towards the stowed position is prevented.

By contracting the linear actuator 49, the engagement lever 45 can be pivoted from the latching position to the release position when the tip section 11 is in the deployed position and the latching member 31 abuts on the abutment surface 43. In the release position, the distal end of the engagement lever 45 is pivoted towards the base member 35 and the contact portion 55 is then offset from the plane in which the latching member 31 moves during the pivotal movement of the tip section 11 out of the deployed position towards the stowed position, so that when the engagement lever 45 is in the release position, the latching member 31 may move away from the abutment surface 43 so as to allow for a pivot movement of the tip section 13 from the deployed position towards the stowed position.

Furthermore, the first and second actuating levers 51, 53 may be dimensioned such that in the release position (not shown in the figures, the coupling between the first actuating lever 51 and the second actuating lever 53 is arranged on a first side of a connecting line 56 connecting the coupling between the first actuating lever 51 and the engagement lever 45 and the coupling between the second actuating lever 53 and the base member 35, whereas in the latching position the coupling between the first actuating lever 51 and the second actuating lever 53 is arranged on a second side of the connecting line 56 opposite the first side. In this way a toggle linkage is provided by the first and second actuating levers 51, 53 so that in the latching position of the engagement lever 45, when the latching element 31 exerts a force on the engagement lever 45, it is not pivoted towards the release position but is kept in the latching position. Thus, the engagement lever 45 locked in the latching position.

When the engagement lever 45 is in the release position and the tip section is pivoted from the stowed position towards the deployed position, the engagement lever 45 can be pivoted towards the latching position by expanding the linear actuator 49, which results in an abutment of the contact portion 55 on the latching element 31. In case the latching element 31 is not yet in close contact with the abutment surface 43 but in close proximity thereto, the linear actuator 49 and the engagement lever 45 will force the latching element 31 in abutment with the abutment surface 43 to reach the deployed position. Thus, it is not necessary that the tip section 13 has reached exactly the deployed position, before the latching arrangement 29 can be brought into the latching position. Instead, in the wing arrangement of the present invention the final alignment of the tip section 13 in the deployed position can also be obtained by the latching arrangement 29.

Figure 7:
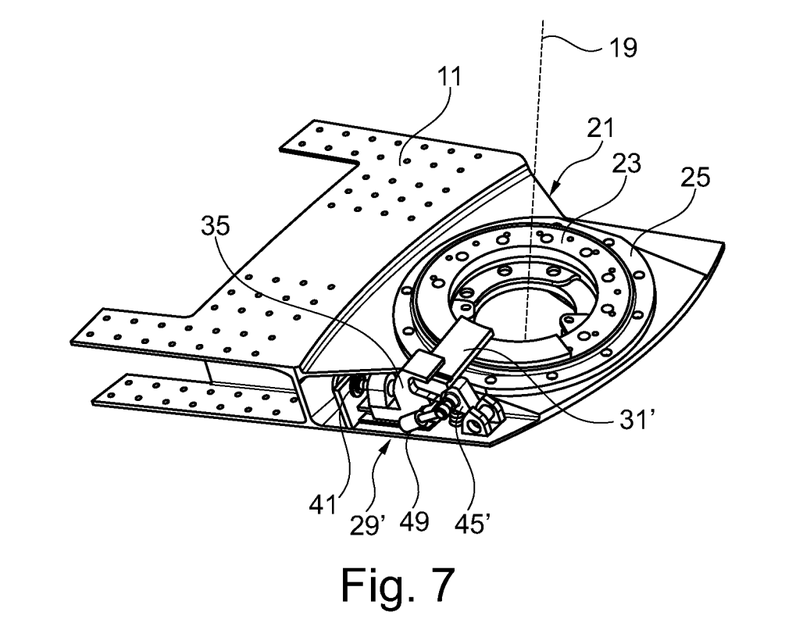
FIG. 7 is a perspective view of the coupling arrangement and the latching arrangement of a second embodiment of a wing arrangement according to the present invention.
Figure 8:
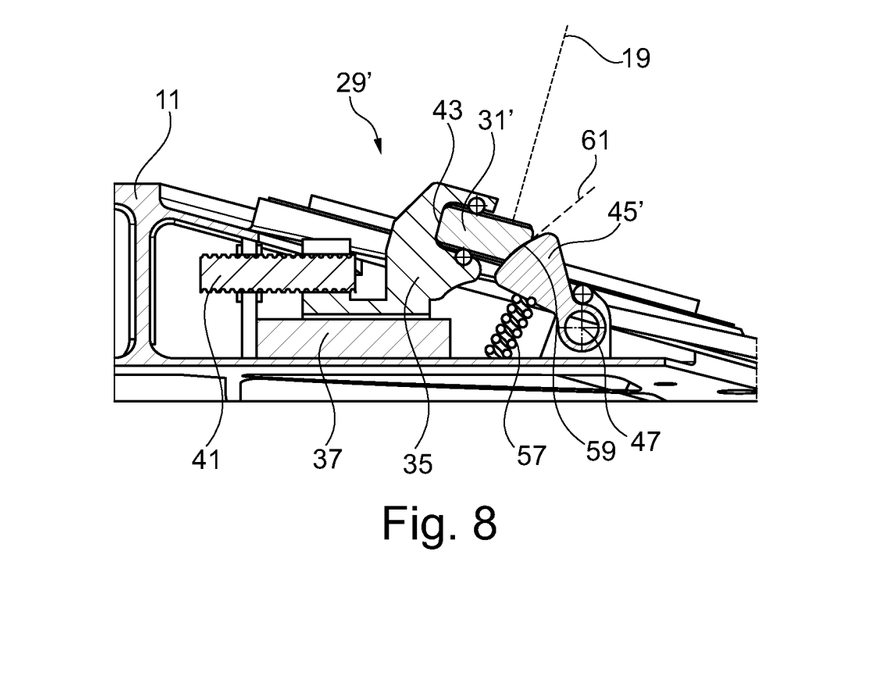
FIG. 8 is a cross sectional view of the latching arrangement of FIG. 7.

FIGS. 7 and 8 show the coupling arrangement 21 and the latching arrangement 29' of a second embodiment of a wing arrangement of the present invention.

The second embodiment differs from the first embodiment described before only in the configuration of the latching arrangement 29'. Hence, also in the second embodiment the coupling arrangement 21 comprises a first coupling part 23 fixedly connected to the third end portion 15 of the tip section 13 and a second coupling part 25 which is fixedly connected to the second end portion 11 on the base section 7 of the wing 5.

Also in the second embodiment, the latching arrangement 29' comprises a latching member 31' which is fixedly mounted on the first coupling part 23 and extends away from the pivot axis 19. A base member 35 is slidably supported on a rail element 37 fixed to the second end portion 11, the position of the base element 35 along the rail element 37 being adjustable by means of a threaded rod 41 in the manner as described in connection with the first embodiment.

The base member 35 comprises an abutment surface 43 on which the latching element 31' abuts when the tip section 13 is in the deployed position (see FIG. 8). Further, an engagement lever 45' is pivotably mounted about a lever axis 47 on the second end portion 11 rather than on the base element 35 as in case of the first embodiment, and a spring member 57 biases the engagement lever 45' towards the latching position. Furthermore, a linear actuator 49 is arranged between the second end portion 11 and the engagement lever 45' so that the engagement lever 45' can be pivoted to a release position against the biasing force of the spring member 57 by contracting the linear actuator 49.

In the latching position a contact portion 59 on the engagement lever 45' is arranged in the plane in which the latching member 31' moves when the tip section 13 pivots between the stowed position and the deployed position, whereas in the release position of the engagement lever 45' the contact portion 59 is pivoted out of that plane so that the latching element 31' is not prevented from pivoting when the tip section 13 is moved from the deployed position towards the stowed position.

As can be seen in FIG. 8, when the tip section 13 is in the deployed position, the latching element 31' abuts on the abutment surface 43 on the base member 35, and the engagement lever 45', when being in the latching position, abuts on a surface section of the latching member 31' facing away from the abutment surface 43 so that a pivotal movement of the tip section 13 about the pivot axis 19 is prevented, i.e. the tip section 13 is latched in the deployed position.

In particular, when the tip section 13 is in the deployed position and the engagement lever 45' is in the latching position, so that its contact portion 59 abuts on the latching member 31', the contact plane 61 between the contact portion 59 and the latching member 31 is inclined with respect to a plane perpendicular to the pivot axis 19. With such an arrangement when the engagement lever 45' is in the latching position and the latching member 31' is forced towards the stowed position, the frictional engagement between the latching member 31' and the contact portion 59 of the engagement lever 45' results in a torque which keeps the engagement lever 45' in the latching position. Hence, locking of the engagement lever 45' and the latching arrangement in the latching position is obtained.

Moreover, also in the second embodiment, the engagement member or engagement lever 45' can be moved towards its latching position and may then force the latching element 31' into abutment with the abutment surface 43 on the base member 35, so that it is not necessary, that the tip section 13 is exactly brought into the deployed position, before the latching arrangement 29' can be moved into the latching position.

Figure 9:
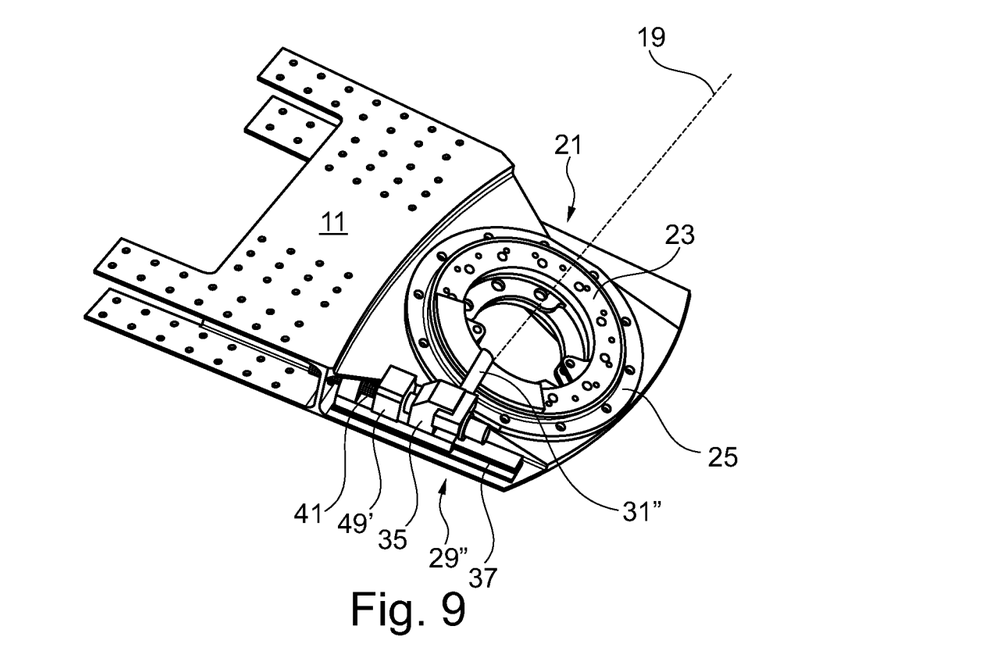
FIG. 9 is a perspective view of the coupling arrangement and the latching arrangement of a third embodiment of a wing arrangement according to the present invention.
Figure 10:
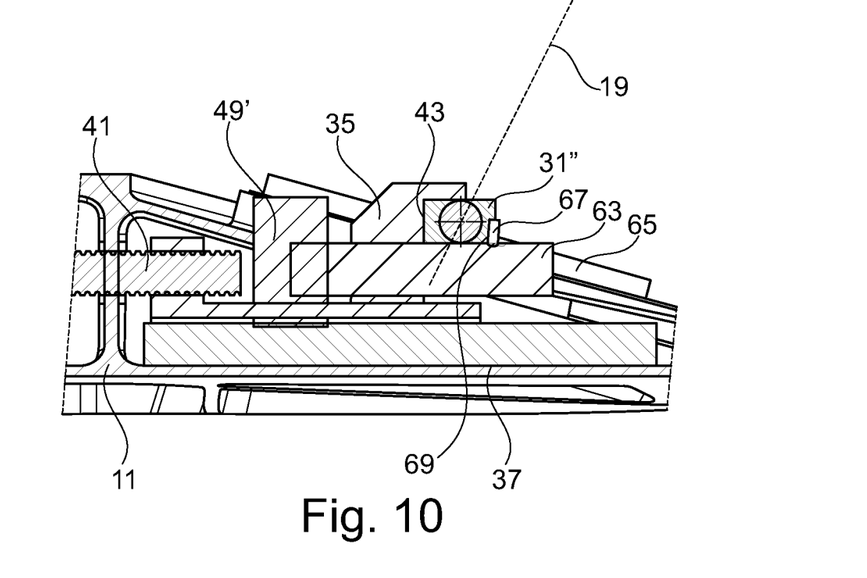
FIG. 10 is a cross sectional view of the latching arrangement of FIG. 9.

In FIGS. 9 and 10 the coupling arrangement 21 and the latching arrangement 29" of a third embodiment of a wing arrangement of the present invention is shown.

The third embodiment differs from the afore-mentioned first and second embodiments only in the configuration of the latching arrangement 29". In the third embodiment the coupling arrangement 21 also comprises a first coupling part 23 fixedly connected to the third end portion 15 of the tip section 13 and a second coupling part 25 which is fixedly connected to the second end portion 11 on the base section 7 of the wing 5. The latching arrangement 29" of the third embodiment comprises a latching member 31" which is fixedly mounted on the first coupling part 23 and extends away from the pivot axis 19. A base member 35 is slidably supported on a rail element 37 fixed to the second end portion 11, the position of the base element 35 along the rail element 37 being adjustable by means of a threaded rod 41 in the manner as described in connection with the first embodiment.

The base member 35 comprises an abutment surface 43 on which the latching element 31" abuts when the tip section 13 is in the deployed position (see FIG. 10).

In this embodiment the engagement member comprises a main portion in the form of a cylinder 63 which is pivotably supported about a member axis 65 on the base member 35 so that the cylinder 63 may pivot about the member axis 65 between the release position and the locking position. To this end the base member 35 comprises an actuator 49' which is capable of pivoting the cylinder 63 about the member axis 65. Further, a projection 67 is provided on the cylinder 63 projecting beyond the circumferential wall of the cylinder 63 in a radial direction relative to the member axis 65 and comprising a stop surface 69 which points to the abutment surface 43, when the cylinder 63 is pivoted in the latching position. The projection 67 extends around the circumferential surface of the cylinder 63 over at most 180° and the plane in which the stop surface 69 on the projection extends is inclined with respect a plane perpendicular to the member axis 65.

The cylinder 63, due to its cylindrical shape, both in the release position and in the latching position does not extend into a planar space in which the latching member 31" moves during pivotal movement between the deployed position and the stowed position. Hence the cylinder itself does not prevent the latching member 31" and hence the tip section 13 from a pivotal movement out of the deployed position or towards the latter regardless whether the cylinder 63 is in the release or latching position.

However, when the cylinder 63 is in the latching position the projection 67 is dimensioned such that it extends into said planar space whereas it does not when the cylinder 63 is in the release position. In particular, when the tip section 13 is in the deployed position and, hence, the latching member 31" abuts on the abutment surface 43, the latching member 31" is received between the abutment surface 43 and the stop surface 67, when the cylinder 63 is pivoted into the latching position.

In the third embodiment, when the cylinder 63 is pivoted to the release position by the actuator 49', the tip section 13 together with the latching member 31" can be pivoted towards the deployed position without the latching member 31" getting into contact with the cylinder 63 or the projection 67. When the tip section 13 has reached the deployed position or the latching member 31" is almost in direct contact with the abutment surface 43, the actuator 49' is activated so that the cylinder 63 is pivoted about the member axis 65 into the latching position in which the latching member 31" is sandwiched between the abutment surface 43 and the stop surface 69 on the projection 67. Further, since the stop surface 69 extends in a plane being inclined with respect to a plane perpendicular to the member axis 65, pivotal movement of the cylinder 63 presses the latching member 31" towards the abutment surface 43 until there is direct contact.

Thus, also in this embodiment it is not required that the tip section is exactly in the deployed position, before the latching arrangement 29" can be brought into the latching mechanism can be brought into the latching position.

Instead, a certain misalignment of the tip section 13 in relation to the deployed position after operating the actuation device 27 can be compensated for by activating the actuator 49' and pressing the latching member 31" against the abutment surface 43 due to the engagement of the projection 67 with the latching member 31" during the pivotal movement of the cylinder 63.

Finally, when the angle of inclination of the plane in which the stop surface 69 extends relative to the plane perpendicular to the member axis 65 is properly chosen, a force in the direction of the member axis 65 applied by the latching member 31" on the projection 67 is not capable of pivoting the cylinder 63, so that the latching member 31", and hence the tip section 13, is also locked when the cylinder 63 is pivoted into the latching position.

Finally, it should be noted that even though in the embodiments discussed before the latching element 31, 31', 31" is coupled to the tip section 13 and the latching arrangement 29, 29', 29" is mounted on the base section 7, it is also conceivable that the latching element 31, 31', 31" will be mounted on the base section 7 whereas the latching arrangement 29, 29', 29" is coupled to the tip section 13.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing arrangement for an aircraft comprising:
a wing having a base section and a tip section, the base section having a first end portion and a second end portion, the tip section having a third end portion and a fourth end portion,
wherein the first end portion is adapted to be coupled to the fuselage of the aircraft,
wherein the second end portion and the third end portion are coupled with each other by a coupling arrangement such that the tip section is pivotable with respect to the base section about a pivot axis between a stowed position and a deployed position, the spanwise length of the wing between the first end portion and the fourth end portion being larger in the deployed position than in the stowed position,
the wing arrangement further comprising a latching arrangement configured to latch the tip section relative to the base section when in the deployed position, the latching arrangement including a latching member and an engagement device, wherein the latching member is fixed to one of the second end portion and the third end portion,
wherein the engagement device comprises:
a base member supported in a predetermined position on the other of the second end portion and the third end portion and which comprises an abutment surface, and
an engagement member supported on said other of the second end portion and the third end portion and which is movable between a release position and a latching position by an actuator coupled to the engagement member and said other of the second end portion and the third end portion,
wherein when the tip section is in the deployed position, the latching member abuts on the abutment surface and the engagement member can be moved between the release position and the latching position,
wherein when the latching member abuts on the abutment surface and the engagement member is in the latching position, the engagement member abuts on a surface section of the latching member facing away from the abutment surface to prevent a pivot movement of the tip section about the pivot axis out of the deployed position towards the stowed position,
wherein when the engagement member is in the release position, the latching member may move away from the abutment surface to allow pivot movement of the tip section from the deployed position towards the stowed position, and
wherein the predetermined position of the base member relative to said other of the second end portion and the third end portion is adjustable such that the base member may move along a direction extending in a plane which is inclined to the pivot axis and inclined to a line connecting the base member and the pivot axis.

2. The wing arrangement according to claim 1, wherein the engagement member and the actuator are coupled to the base member.

3. The wing arrangement according to claim 1, wherein the third end portion is said one of the second end portion and the third end portion and wherein the second end portion is said other of the second end portion and the third end portion.

4. The wing arrangement according to claim 1, wherein the coupling arrangement comprises a first coupling part and a second coupling part,
wherein the first coupling part and the second coupling part are pivotably coupled with each other in such a manner that the second coupling part is guided for a pivot movement by the first coupling part about the pivot axis,
wherein the first coupling part is fixedly connected to said one of the second end portion and the third end portion and the second coupling part is fixedly connected to said other of the second end portion and the third end portion and
wherein the latching member is mounted on the first coupling part.

5. The wing arrangement according to claim 4, wherein the first coupling part has an annular shape and surrounds the pivot axis and
wherein the latching member extends radially with respect to the pivot axis beyond the first coupling part.

6. The wing arrangement according to claim 1, wherein the engagement member is supported pivotably on the base member so that the engagement member may pivot about a member axis between the release position and the locking position,
wherein the engagement member comprises a main portion which is dimensioned such that both in the release position and in the latching position the main portion does not extend into a planar space in which the latching member moves during pivotal movement between the deployed position and the stowed position, wherein a projection is provided on the main portion projecting beyond the main portion an a radial direction relative to the member axis and comprising a stop surface which points to the abutment surface, when the engagement member is in the latching position and wherein the projection is dimensioned such that it does not extend into said planar space when the engagement member is in the release position, and that when the engagement member is in the latching position the projection extends into the planar space such that when the tip section is in the deployed position, the latching member is received between the abutment surface and the stop surface.

7. The wing arrangement according to claim 6, wherein the stop surface is planar and inclined with respect to the member axis.

8. A wing arrangement for an aircraft comprising:

a wing having a base section and a tip section, the base section having a first end portion and a second end portion, the tip section having a third end portion and a fourth end portion, wherein the first end portion is adapted to be coupled to the fuselage of the aircraft, wherein the second end portion and the third end portion are coupled with each other by a coupling arrangement such that the tip section is pivotable with respect to the base section about a pivot axis between a stowed position and a deployed position, the spanwise length of the wing between the first end portion and the fourth end portion being larger in the deployed position than in the stowed position, the wing arrangement further comprising a latching arrangement configured to latch the tip section relative to the base section when in the deployed position, the latching arrangement including a latching member and an engagement device, wherein the latching member is fixed to one of the second end portion and the third end portion, wherein the engagement device comprises:

a base member supported in a predetermined position on the other of the second end portion and the third end portion and which comprises an abutment surface, and an engagement member supported on said other of the second end portion and the third end portion and which is movable between a release position and a latching position by an actuator coupled to the engagement member and said other of the second end portion and the third end portion, wherein when the tip section is in the deployed position, the latching member abuts on the abutment surface and the engagement member can be moved between the release position and the latching position, wherein when the latching member abuts on the abutment surface and the engagement member is in the latching position, the engagement member abuts on a surface section of the latching member facing away from the abutment surface to prevent a pivot movement of the tip section about the pivot axis out of the deployed position towards the stowed position, wherein when the engagement member is in the release position, the latching member may move away from the abutment surface to allow pivot movement of the tip section from the deployed position towards the stowed position, wherein the engagement member is formed as an engagement lever which is pivotably coupled about a lever axis on said other of the second end portion and the third end portion so that the engagement lever may pivot between the latching position and the release position about the lever axis, and wherein the lever axis is arranged such that in the release position a contact portion of the engagement lever for contacting the latching member in the latching position is offset from the plane in which the latching member moves during the pivotal movement of the tip section.

9. The wing arrangement according to claim 8, wherein the engagement device comprises a first actuating lever and a second actuating lever, wherein the first actuating lever is pivotably coupled with the engagement lever, wherein the second actuating lever is pivotably coupled to the first actuating lever spaced from the pivotal coupling between the first actuating lever and the engagement lever, wherein the second actuating lever is pivotably coupled to said other of the second end portion and the third end portion and wherein the actuator is a linear actuator the first end of which being coupled to said other of the second end portion and the third end portion and the other end being connected to the first or second actuating lever.

10. The wing arrangement according to claim 9, wherein the engagement lever is pivotably coupled about a lever axis on said other of the second end portion and the third end portion such that it is pivotably mounted on the base member, wherein the second actuating lever is coupled to said other of the second end portion and the third end portion such that it is pivotably mounted on the base member and wherein the first end of the linear actuator is coupled to said other of the second end portion and the third end portion such that it is mounted on the base member.

11. The wing arrangement according to claim 9, wherein in the release position the coupling between the first actuating lever and the second actuating lever is arranged on a first side of a connecting line connecting the coupling between the first actuating lever and the engagement lever and the coupling between the second actuating lever and said other of the second end portion and the third end portion and wherein in the latching position the coupling between the first actuating lever and the second actuating lever is arranged on a second side of the connecting line opposite the first side.

12. The wing arrangement according to claim 8, wherein the engagement lever is biased towards the latching position and wherein the actuator is a linear actuator the first end of which being coupled to said other of the second end portion and the third end portion and the other end being connected to the engagement lever.

13. The wing arrangement according to claim 12, wherein the engagement lever is pivotably coupled about a lever axis on said other of the second end portion and the third end portion such that it is pivotably mounted on the second end portion and wherein the first end of the linear actuator is coupled to said other of the second end portion and the third end portion such that it is mounted on the second end portion.

14. The wing arrangement according to claim 12, wherein when the tip section is in the deployed position and the engagement lever is in the latching position, a contact plane between the contact portion of the engagement lever and the latching member is inclined with respect to a plane perpendicular to the pivot axis.

\* \* \* \* \*